C. H. REID.
Lathe-Chuck.
No. 226,246.
Patented April 6, 1880.
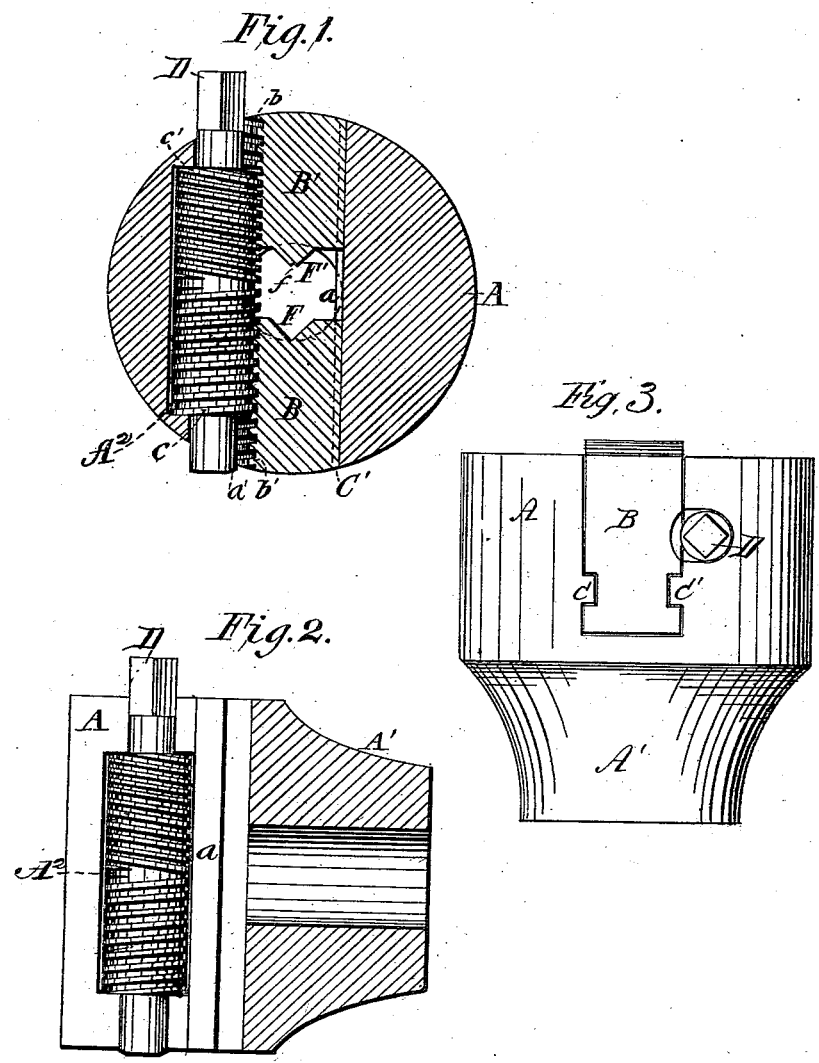

UNITED STATES PATENT OFFICE.

CHARLES H. REID, OF DANBURY, CONNECTICUT.

LATHE-CHUCK.

SPECIFICATION forming part of Letters Patent No. 226,246, dated April 6, 1880.

Application filed March 29, 1878.

*To all whom it may concern:*

Be it known that I, CHARLES H. REID, of Danbury, in the county of Fairfield and State of Connecticut, have invented a new and valuable Improvement in Chucks for Lathes; and I do hereby declare that the following is a full, clear, and exact description of the construction and operation of the same, reference being had to the annexed drawings, making a part of this specification, and to the letters and figures of reference marked thereon.

Figure 1 is a transverse vertical sectional view of my improved chuck. Fig. 2 is a longitudinal sectional view. Fig. 3 is an elevation showing the outside.

My invention relates to chucks for turning-lathes.

The object of my invention is to adapt lathe-chucks to holding drills of different sizes and to bring the center of the drill, of whatever size, exactly on the same line.

My invention consists in peculiarly-shaped laterally-adjustable jaws threaded on one side, to engage with an operating right-and-left screw the threads of which are at different pitch on the different sections.

In the accompanying drawings, A is the cylindrical body or bed of the chuck, which has a smaller cylindrical extension, A'. The extension A' is longitudinally cored out or perforated, as shown in Fig. 2, to afford means of attachment. The body or bed A is channeled laterally to receive the laterally-adjustable jaws B B'. The jaws are grooved on each side to receive the guide tongues or tenons upon the bed A, as shown at C C', Fig. 3.

The bed A is constructed with a recess, A², which is parallel to the channel. This recess receives the shaft D, which is provided with right and left screw-threads $c$ $c'$ and projecting prismatic head, to provide for turning it, as shown. The threads upon the two sections of this shaft D are at different inclinations, and operate in opposite directions, so as to open or close the jaws B B'. The shaft D is journaled into the body A.

The opposing faces of the jaws are peculiarly constructed. The face of the jaw B has a trough or recess, F, which is V-shaped in cross-section. The face of jaw B' has a V-shaped projection, F', corresponding to the trough F on the face of jaw B. The ridge of projection F' has a longitudinal groove, $f$. When the jaws are closed there will still remain a small opening, afforded by the groove $f$, which is intended to receive drills of a diminutive size. This groove $f$ also furnishes a better bearing for clamping larger drills.

The idea of having the threads of the two sections of the shaft D at different inclinations is to provide for the self-centering of the drill. It is apparent that the drill will find a center differing in every case according to its size. A larger drill will not rest so far down the sides of the trough or recess F as a smaller one, thereby changing its center each time. Hence I make the threads $c'$ $b$ of greater pitch than the threads $c$ $b'$, to increase the speed of the jaw B' in descending, in order to bring the two jaws to bear upon the drill, of whatever size, the moment its center reaches the center line of the chuck.

It will be seen that the chuck can thus be made to accommodate any sized drill, and always find the same center.

I am aware that chuck-jaws have been heretofore simultaneously operated by a screw with right and left threads, said screw being centrally located, transverse to the axis of the chuck, so as to prevent the introduction of any body past said screw.

I am also aware that a center punch has been made with reciprocating jaws with laterally-projecting lugs, through which a shaft provided with right and left screw-threads was passed to operate said jaws.

I claim—

1. As an improvement in chucks the jaws of which are moved directly and in a right line by a right-and-left-threaded screw, the location of the screw at and against the side of the jaws, as set forth.

2. The screw-shaft D, with right and left hand screw-threads of different pitch or inclination, as described, jointly with the jaws B B', having screw-threads of correspondingly-different pitch or inclination.

In testimony that I claim the above I have hereunto subscribed my name in the presence of two witnesses.

CHAS. H. REID.

Witnesses:
 DOUGLAS FAIRCHILD,
 WILLIAM BURKE.